Aug. 21, 1934.  G. H. HUFFERD ET AL  1,971,184
BALL JOINT
Filed April 15, 1929
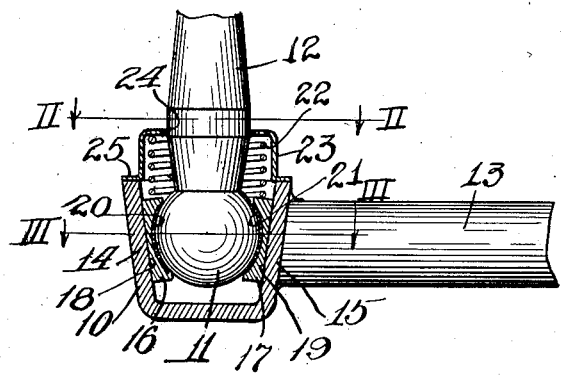
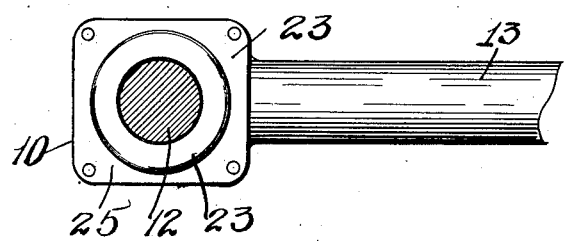
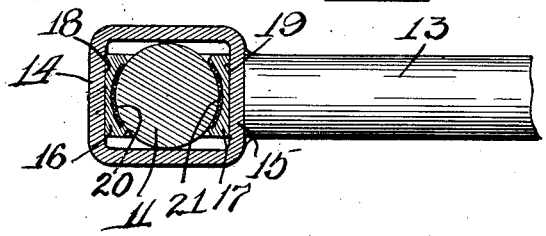
Inventors
George H. Hufferd
Matthew P. Graham
by Charles W. Hill
Attys.

Patented Aug. 21, 1934

1,971,184

UNITED STATES PATENT OFFICE 1,971,184

BALL JOINT

George H. Hufferd and Matthew P. Graham, Detroit, Mich., assignors to Thompson Products, Inc., Cleveland, Ohio, a corporation of Ohio Application April 15, 1929, Serial No. 355,115

5 Claims. (Cl. 287—90)

This invention relates to ball joints and more particularly to ball joints of a wedge type such as may be used in tie rods, in shock absorber links, and the like.

In our copending application entitled Ball joint, Serial No. 315,209, filed October 26, 1928, we have disclosed a self adjusting ball joint wherein renewable ball seat members are vertically slidable on renewable inclined surfaces adapted to maintain the seat members in close wedging contact with the balls. In the present invention, the ball housing is itself formed with inclined or tapered walls between which and the ball are positioned reanewable seat members for engagement therewith. Resilient means serve to maintain said ball seat members in wedging engagement with the inner surface of the tapered housing and the ball, whereby a ball joint is provided which will be self adjusting to compensate for wear without altering the center distance or length of the tie rods or the like on which the ball joints are employed.

This, other and further important objects of our invention will be apparent from the disclosures in the specification and accompanying drawing.

The invention (in a preferred form) is illustrated on the drawing and hereinafter more fully described.

On the drawing:

Figure 1 is a vertical longitudinal section through a ball joint embodying the features of this invention, with parts in elevation.

Figure 2 is a sectional view taken substantially on line II—II of Figure 1.

Figure 3 is a sectional view taken substantially on line III—III of Figure 1.

As shown on the drawing:

The reference numeral 10 indicates a housing for a ball 11 of a ball stud 12. Said housing 10 is formed on the end of a rod 13 or secured thereto in any suitable manner. Preferably, the housing 10 is of rectangular cross section with two of its opposing side walls, such as the walls 14 and 15, downwardly and inwardly inclined. it will be appreciated, however, that other forms of housing may be employed, provided that the inner walls thereof are downwardly tapered to provide at least two opposing inclined faces.

In the present embodiment of our invention, a pair of ball seats 16 and 17 having plain outer faces 18 and 19, respectively, are positioned within the housing 10 with said plain surfaces in contact with and slidable upon the inclined inner surfaces of said housing walls 14 and 15, respectively. The inner faces, 20 and 21, of said ball seats 16 and 17, respectively, are spherically concave to receive the ball 11 and are preferably provided with self lubricating surfaces.

After the ball stud with the ball seats 16 and 17 in engagement with the ball thereof have been placed in the housing 10, by insertion through the open top side thereof, a coiled, helical spring 22 is inserted over the shank of said ball stud 12 to rest upon the top surfaces of the ball seats 16 and 17. A closure member 23, having an aperture 24 for receiving the shank of the ball stud 12 and having a lower peripheral flange 25, is inserted over said ball stud with said peripheral flange 25 resting upon the upper edge of the housing 10. Said flange 25 is then spot welded or otherwise secured to the top edge of said housing 10 to hold the spring 22 under compression between the closure member 23 and the ball seats 16 and 17.

By virtue of the downwardly inclined taper of the side walls 14 and 15 of said housing 10, and the resilient pressure of the spring 22 against the upper faces of the ball seats 16 and 17, it will be apparent that said ball seats 16 and 17 will be held in wedging engagement with the ball 11 of the ball stud 12 and the inner faces of said tapered walls 14 and 15. Accordingly, the ball joint is essentially self adjusting to take up automatically for wear and to prevent loosening of the bearing due to road shocks and the like. Obviously, other resilient means than the coiled spring 22 may be employed to exert a constant resilient downward pressure against the ball seats 16 and 17 to maintain the wedging engagement of said ball seats with the ball 11 and the tapered inner walls of the housing 10.

It will thus be apparent that our invention provides an improved and simplified ball joint that is self adjusting and durable in service and that because of its simplicity of structure, is capable of manufacture in quantities at comparatively small cost.

We are aware that numerous details of construction may be varied through a wide range without departing from the principles of this invention, and we therefore do not purpose limiting the patent granted, otherwise than necessitated by the prior art.

We claim as our invention:

1. A ball and socket joint, comprising a housing open at its top side and having walls with downwardly tapered inner surfaces, a ball of a ball stud positioned within said housing with its shank extending through the open side of said housing, ball seats on opposite sides of said ball, a closure for said open side through which said shank extends and resilient means under compression between said closure and ball seats tending to maintain said ball seats in wedging engagement with said ball and said tapered walls.

2. A ball and socket joint, comprising a housing providing a socket having a pair of plane oppositely disposed reversely inclined side walls, a ball of a ball stud disposed in said socket, independently movable seat members disposed on opposite sides of said ball and having inner segmental spherical surfaces contacting said ball and outer plane surfaces slidable on said inclined side walls and resilient means enclosed within said housing constantly urging said seat members into closer wedging engagement with said ball and inclined side walls.

3. A ball and socket joint, comprising a housing providing a socket open at one end and having walls with opposite plane surfaces converging away from said open end, a ball of a ball stud within said socket, independently movable seat members disposed on opposite sides of said ball and having inner segmental spherical surfaces engaging said ball and outer plane surfaces in sliding contact with said wall plane surfaces, a closure for said open end and a spring disposed between said closure and said seat members constantly urging said seat members into closer wedging engagement with said ball and said wall plane surfaces.

4. In a ball and socket joint, a casing at the end of a connecting rod, the casing interiorly having converging plane bearing surfaces, socket bearing seats within the casing for engaging a ball therebetween and bearing respectively against said bearing surfaces, and means normally active for urging the seats upon the ball.

5. A ball and socket joint construction comprising a housing having an opening therethrough, a ball member positioned within said opening, socket members embracing opposite sides of said ball, the outer sides of said socket members and the adjacent sides of said housing opening having plane bearing surfaces converging toward one end of said opening, and automatic means for urging said ball and socket members toward said converging end to tighten said socket members around said ball member.

GEORGE H. HUFFERD.
MATTHEW P. GRAHAM.